United States Patent [19]

Senyek et al.

[11] Patent Number: 5,225,479

[45] Date of Patent: Jul. 6, 1993

[54] POLYMERS DERIVED FROM A CONJUGATED DIOLEFIN, A VINYL-SUBSTITUTED AROMATIC COMPOUND, AND OLEFINICALLY UNSATURATED NITRILE

[75] Inventors: Michael L. Senyek; Howard A. Colvin, both of Tallmadge, Ohio

[73] Assignee: The Goodyear Tire & Rubber Company, Akron, Ohio

[21] Appl. No.: 777,953

[22] Filed: Oct. 17, 1991

[51] Int. Cl.$^5$ ............................ C08L 9/00; C08L 9/02
[52] U.S. Cl. .................................. 524/526; 525/233; 525/234
[58] Field of Search ............... 525/185, 233, 234; 526/340; 524/526

[56] References Cited

U.S. PATENT DOCUMENTS

| | | | |
|---|---|---|---|
| 2,388,346 | 11/1945 | Soday | 525/185 |
| 3,053,800 | 9/1962 | Grabowski et al. | 525/233 |
| 3,554,940 | 1/1971 | Arakawa et al. | 525/185 |
| 3,808,295 | 4/1974 | Kent et al. | 525/233 |
| 3,947,527 | 3/1976 | Li et al. | 260/879 |
| 4,480,078 | 10/1984 | Gujarathi | 526/65 |
| 4,559,374 | 12/1985 | Senyek et al. | 523/348 |
| 4,624,296 | 11/1986 | Takiguchi | 526/340 |

FOREIGN PATENT DOCUMENTS

| | | | |
|---|---|---|---|
| 783627 | 4/1968 | Canada | 525/233 |
| 3837047 | of 0000 | Fed. Rep. of Germany . | |
| 1289310 | 2/1969 | Fed. Rep. of Germany | 525/233 |
| 58-154752 | 9/1983 | Japan | 525/233 |
| 59-66412 | 4/1984 | Japan | 525/233 |
| 60-72910 | 4/1985 | Japan | 525/233 |
| 522982 | 7/1940 | United Kingdom | 526/340 |
| 744455 | 2/1956 | United Kingdom | 526/340 |
| 795706 | 5/1958 | United Kingdom | 526/340 |
| 919381 | 2/1963 | United Kingdom | 525/233 |

OTHER PUBLICATIONS

Literature and/or patent search on acrylonitrile-butadiene-sytrene use in tires and ABS emulsions blended with polybutadiene.

*Primary Examiner*—Joseph L. Schofer
*Assistant Examiner*—N. Sarofin
*Attorney, Agent, or Firm*—Bruce J. Hendricks

[57] ABSTRACT

The present invention relates to a polymer resulting from the copolymerization of at least three monomers. From about 40 to 84 weight percent of the polymer is derived from a conjugated diolefin, from about 15 to 50 weight percent of the polymer is derived from a vinyl substituted aromatic compound and from about 1 to 8 weight percent of the polymer is derived from an olefinically unsaturated nitrile. These polymers may be added to a tread rubber stock for improved wet traction and improved abrasion resistance.

12 Claims, No Drawings

POLYMERS DERIVED FROM A CONJUGATED DIOLEFIN, A VINYL-SUBSTITUTED AROMATIC COMPOUND, AND OLEFINICALLY UNSATURATED NITRILE

BACKGROUND OF THE INVENTION

It is generally desirable to improve the wet traction of a tire tread. For example, it is common to compound high styrene SBR polymers in tread stock recipes with a concomitant improvement in wet traction. Unfortunately, along with the improvement in the wet traction there is a corresponding decrease in the abrasion resistance of the tire resulting in increased tire wear. For these reasons, it is very desirable to improve the wet traction of the tire without sacrificing the abrasion resistance.

SUMMARY OF THE INVENTION

The present invention relates to a polymeric composition resulting from the copolymerization of at least three monomers. The unique polymeric composition is derived from about 40 to about 84 weight percent of a conjugated diolefin, from about 15 to 50 weight percent of a vinyl-substituted aromatic compound, and from about 1 to 8 weight percent of an olefinically unsaturated nitrile. These novel polymeric compositions may be added to conventional tread stock recipes for improved wet traction and improved abrasion resistance.

DETAILED DESCRIPTION OF THE INVENTION

There is disclosed a polymer resulting from the copolymerization of at least three monomers comprising:

(a) from about 40 to about 84 weight percent of the polymer being derived from a conjugated diolefin selected from the group consisting of 1,3-butadiene, 2,3-dimethyl 1,3-butadiene, 2-methyl-1-3-butadiene, 2-ethyl 1,3-butadiene, 1,3-pentadiene, 2-methyl-1,3-pentadiene, 1,3-hexadiene, 2-phenyl 1,3-butadiene, 3-4-dimethyl-1,3-hexadiene, 1,3-heptadiene, 1,3octadiene, 4,5 diethyl-1,3-octadiene, 3-methyl 1,3-pentadiene, 4-methyl-1,3-pentadiene or mixtures thereof;

(b) from about 15 to about 50 weight percent of the polymer being derived from a vinyl-substituted aromatic compound containing from 8 to 16 carbon atoms; and (c) from about 1 to about 8 weight percent of the polymer being derived from an olefinically unsaturated nitrile selected from the group consisting of acrylonitrile, methacrylonitrile, ethacrylonitrile, crotononitrile, or mixtures thereof.

Depending on the relative ratio of the monomers, the glass transition temperature of the polymer will vary. Generally speaking, the glass transition temperature of the polymer will range from about to $-60°$ C. to about $0°$ C. Preferably, the glass transition temperature will range from about $-45°$ C. to about $-15°$ C.

As mentioned above, the polymeric composition is derived from about 40 to about 84 weight percent of a conjugated diolefin. Preferably, from about 50 to about 70 weight percent of the polymer is derived from the conjugated diolefin. The preferred conjugated diolefin is 1,3-butadiene.

From about 15 to about 50 weight percent of the polymer is derived from a vinyl-substituted aromatic compound containing from 8 to 16 carbon atoms. Representative of the vinyl-substituted aromatic compounds which may be used to prepare the composition of the present invention includes styrene, alpha. methylstyrene, vinyl toluene, 3-methylstyrene, 4-methylstyrene, 4-cyclohexylstyrene, 4-paratolylstyrene, para-chlorostyrene, 4-tert-butyl styrene, 1-vinylnaphthalene, 2-vinylnaphthalene or mixtures thereof. Preferably, from about 30 to 45 weight percent of the polymer is derived from the vinyl-substituted aromatic compound. The preferred vinyl-substituted aromatic compound is styrene.

From about 1 to about 8 weight percent of the polymer is derived from an olefinically unsaturated nitrile. Preferably, from about 2 to 6 weight percent of the polymer is derived from the olefinically unsaturated nitrile. The preferred olefinically unsaturated nitrile is acrylonitrile.

The polymeric compositions of the present invention can be prepared by any of the known general techniques of polymerization, including free radical solution polymerization, emulsion or suspension polymerization techniques by batch, continuous or intermittent addition of the monomers and other components. The preferred method of preparation is an emulsion polymerization. The polymerization is preferably carried out in an aqueous medium in the presence of emulsifiers and a free-radical generating polymerization initiator at a temperature of from about $0°$ C. to $100°$ C., in a substantial absence of molecular oxygen. Preferably, the olefinically unsaturated nitrile is continuously or incrementally added to the reactor depending if the process is continuous or batch.

In the emulsion polymerization, other ingredients such as acids, electrolytes, chain transfer agents, chelating agents, and similar ingredients known in the art to be useful in emulsion polymerization may be employed in any of the feed streams.

A representative chelating agent useful in preparing the composition of the present invention is the tetrasodium salt of ethylenediaminetetracetic acid. Conventional amounts of the chelating agents may be used.

The electrolytes traditionally used in the latex industry may be used to prepare the composition of the present invention. Typical of these electrolytes are tetra sodium and potassium pyrophosphates, tri sodium and potassium phosphates, dipotassium and disodium hydrogen phosphates, potassium and ammonium carbonates, bicarbonates and sulfites. More specifically, tetra sodium and potassium pyrophosphates and tri sodium and potassium phosphates are preferred. The concentrations of the electrolytes are those minimum amounts necessary for achieving the desired effect.

Conventional modifiers or chain transfer agents may be used to prepare the elastomers of the present invention. Examples of these chain transfer agents include mercaptans, bromoform, carbon tetrabromide, and carbon tetrachloride. The most preferred are mercaptans. Examples of suitable mercaptans are n. octyl mercaptan, n-nonyl mercaptan, tertiary-nonyl mercaptan, n-decyl mercaptan, n-dodecyl mercaptan, sec-dodecyl mercaptan, tertiary-dodecyl mercaptan, tertiary-tetradecyl mercaptan, tertiary-hexadecyl mercaptan, secondary-hexadecyl mercaptan, n-hexadecyl mercaptan, or mixtures of mercaptans. It is possible to employ any of such modifiers, individually or in combination contingent to achieving desired polymer properties. With the monomers which are used to prepare the composition of the present invention, it is preferable that a modifier be present. Tertiary-dodecyl mercaptan is a preferred chain transfer agent. Chain transfer agents are conventionally used at a level of 0.05 to 0.8 phm (parts per one hundred parts of monomers). The chain transfer agent may be either premixed with the primary monomers or charged separately.

Suitable free radical polymerization initiators used to prepare the compositions of the present invention are those which are traditionally utilized in emulsion polymerization. Typical initiators or catalysts are persulfates, water soluble peroxides, and hydroperoxides. Typical examples of these initiators are ammonium, potassium and sodium persulfate, hydrogen peroxide, tertiary-butyl hydroperoxide, cumene hydroperoxide, para-menthane hydroperoxide, pinane hydroperoxide, and peroxy carbonates. Preferably, the hydroperoxides are used.

Other catalysts such as redox catalysts may be employed. One such redox system consists of ferrous sulfate heptahydrate, and sodium formaldehyde sulfoxylate. The advantages of the redox catalyst are well known in the art and usually allow lower polymerization temperatures. The initiators or catalysts are used in amounts sufficient to cause polymerization.

A listing of various emulsifiers and detergents which may be used to prepare the composition of the present invention is given in the book "McCutcheon's Emulsifiers and Detergents, 1981 Annuals," which is incorporated herein by reference in its entirety. The emulsifiers useful in this invention may be a combination of one or more emulsifiers of the anionic, cationic, non-ionic, or amphoteric class of surfactants. Suitable anionic emulsifying agents are alkyl sulfonate, alkyl aryl sulfonates, condensed naphthalene sulfonates, alkyl sulfates, ethoxylated sulfates, phosphate esters, and esters of sulfosuccinic acid. Representative of these emulsifiers are sodium-alpha-olefin ($C_{14}$–$C_{16}$) sulfonates, alkali metal or ammonium dodecylbenzene sulfonates, disodium dodecyl diphenyloxide disulfonate, disodium palmityl diphenyloxide disulfonate, sodium, potassium or ammonium linear alkyl benzene sulfonate, sodium lauryl sulfate, ammonium alkyl phenolethoxylate sulfate, ammonium or sodium lauryl ether sulfate, ammonium alkyl ether sulfate, sodium alkyl ether sulfate, sodium dihexyl sulfosuccinate, sodium dicyclohexylsulfosuccinate, sodium diamyl sulfosuccinate, sodium diisobutylsulfosuccinate, disodium ethoxylated nonyl phenol half ester of sulfosuccinic acid, tetrasodium N-(1,2- dicarboxyethyl)-N-octadecyl sulfosuccinate, disodium bistridecyl sulfosuccinate, sodium salt of alkyl aryl polyether sulfate, lauryl alcohol ether sulfate, sodium salt of condensed naphthalene sulfonic acid, complex phosphate ester of ethylene oxide adduct and mixtures thereof. Also, the sodium or potassium salts of rosin acid and sodium and potassium salts of mixed fatty acids and mixtures thereof may be used. The amount of emulsifying agents (surfactants) may vary. Conventionally, the concentration of the emulsifying system is normally in the range of from about 0.3 to 8.0 phm in the polymerization system.

The polymers of the present invention contemplates the incorporation of polymerizable antioxidants. These antioxidants have shown great potential in the stabilization of oxidizable organic materials due to their nonextractability and nonvolatility. These antioxidants as monomers are polymerized with one or more comonomers so as to have the antioxidant moiety chemically attached to the polymer structure. The following list is representative of polymerizable antioxidants that can be used in the process of this invention:

N-(4-anilinophenyl)acrylamide
N-(4-anilinophenyl)methacrylamide
N-(4-anilinophenyl)maleimide
N-(4-anilinophenyl)itaconimide
4-anilinophenyl acrylate
4-anilinophenyl methacrylate
3-N (4'-anilinophenyl)amino-2- hydroxy-propyl methacrylate Such polymerizable antioxidants are incorporated into the polymers in useful amounts. These polymerizable antioxidants can be considered functional or specialty monomers and may be used accordingly.

The polymers of the present invention have particular application as a component to a rubber stock. In particular, the polymers of the present invention have particular utility when subsequently blended with natural rubber or a rubber derived from a diene monomer to form a tread rubber stock. The weight ratio of the polymeric compositions of the present invention with the rubber may vary. For example, from about 1 to about 99 parts by weight of the polymeric composition may be combined with from about 99 to about 1 parts by weight of natural rubber or the rubber derived from a diene monomer. Preferably, from about 25 to about 85 parts by weight of the polymeric composition of the present invention is combined with from about 75 to about 15 parts of the natural rubber or rubber derived from a diene monomer. The rubber derived from a diene monomer may be polybutadiene, styrene-butadiene rubber (SBR), synthetic polyisoprene rubber, isoprene-butadiene rubber, isoprene-butadiene-styrene rubber, nitrile-butadiene rubber (NBR) carboxylated nitrile rubber and EPDM. These rubbers, as known to those skilled in the art, may be made by various polymerization processes. For example, free radical emulsion polymerization, free radical solution polymerization, anionic or cationic polymerization or Ziegler-Natta polymerization may be used. Preferably, the rubber is polybutadiene rubber.

The rubber or rubber derived from a diene monomer, when combined with the polymers of the present invention, may be in a latex or dried form. For ease of blending, the rubber is preferably in a latex form especially when the polymers of the present invention are made by emulsion polymerization techniques and are in the form of a latex. Blending of the latex permits an easier blending technique versus dry blending in a Banbury; however, dry blending may be used.

In addition to the polymers of the present invention, the rubber stock may contain conventional additives including fillers, pigments, zinc oxide, stearic acid, accelerators, sulfur vulcanizing agents, stabilizers, antidegradants, processing oils, tackifiers, plasticizers, waxes, prevulcanization inhibitors, extender oils, and the like. Representative of suitable fillers include carbon black, silica, titanium dioxide and clay which are typically added in amounts ranging from about 25 to about 125 phr depending on the application of the stock. Representative of conventional accelerators are amines, guanidines, thioureas, thiazoles, thiurams, sulfenamides, dithiocarbamates and xanthates which are typically added in amounts from about 0.2 to 5 phr. Representative of sulfur vulcanizing agents include elemental sulfur (free sulfur), or sulfur donating vulcanizing agents, for example, dithiocarbamate, polymeric polysulfide or sulfur olefin adducts. The amount of the sulfur vulcanizing agent will vary depending upon the type of rubber and particular type of sulfur vulcanizing agent but generally from about 0.1 phr to about 5 phr with a range of from about 0.5 to about 2 being preferred. Representative of the antidegradants which may be used in the rubber stock include monophenols, bisphenols, thiobisphenols, polyphenols, hydroquinone derivatives, phosphites, phosphate blends, thioesters, naphthylamines, diphenylamines as well as other diarylamines derivatives, para-phenylene diamines, quinolines and blended amines. Antidegradants are generally used in an amount ranging from about 0.10 phr to about 10 phr. Representative of processing oils which may be used in the rubber stock include highly aromatic oils, aliphatic-naphthenic aromatic resins, polyethylene glycol, petroleum oils, ester plasticizer, vulcanized vegetable oils, pine tar, phenolic resins, petroleum resins, polymeric esters and rosins. These processing oils may be used in conventional amounts ranging from about 0 to about 45 phr.

A rubber stock containing the polymer of the present invention may be used to form a number of composites including tires, belts, shoe soles, or hoses. Preferably, the composite is a tire.

The following examples are used to illustrate and not limit the present invention. All parts are by weight unless specifically stated otherwise.

EXAMPLE 1

Styrene-Butadiene-Acrylonitrile Polymer (SBR-6AN)

To a ten gallon reactor which had been evacuated under reduced pressure, a solution of 17.62 kg of water, 16.1 grams of the sodium salt of condensed naphthalene sulfonic acid (85% active), 40 grams of tripotassium phosphate, 400 grams of a mixture of the potassium soap of disproportionated rosin acid and the sodium salt of hydrogenated mixed fatty acids was added, and the pH of the solution was adjusted to 10-11 with 10 weight percent sodium hydroxide solution. Next, a solution of 475 grams of water, 2.9 grams of the tetrasodium salt of ethylenediaminetetraacetate (40%), 0.73 grams of ferrous sulfate heptahydrate, and 4.0 grams of sodium formaldehyde sulfoxylate was added. Then 3.9 kg of styrene, 227.5 grams of acrylonitrile, 9.1 grams of tert dodecyl mercaptan and 4.54 kg of 1,3-butadiene were added. The reaction mixture was cooled to 10° C. and a solution of 8.3 grams of para-menthane hydroperoxide (55% active) and 91 grams of styrene was added. The remaining acrylonitrile was incremented into the polymerization mixture as follows: 136.5 grams at 20% conversion, 91 grams at 38% conversion, and 91 grams at 53% conversion. The mixture was agitated at 250 rpm. The polymerization was shortstopped with a solution containing 386 grams of water, 144 grams of sodium dimethyldithiocarbamate (40% active), and 5.4 grams of N,N-diethylhydroxylamine at 68% conversion. The residual 1,3-butadiene was degassed, and the residual styrene and acrylonitrile were removed by steam stripping for 3 hours at 50° C. The resulting latex had a pH of 11.2, % solids of 19.1%, residual styrene of 0.05%, and residual acrylonitrile content of 0% (by GLC method). To 750 grams of the stripped latex, 2.5 grams of Wingstay ® 29 and 125 grams of Polygard ™ [tris(-nonylphenyl)phosphite] antioxidants were added. The latex was then coagulated by pouring slowly into a hot (75°-80° C.) solution of 3,000 grams of water, 15 grams of sodium chloride and 2.4 grams of a polyamine at a pH of 3 to 4. The resulting wet rubber crumb was dried in a forced air oven at 65° C. The dry rubber had a Mooney viscosity (100° C.) of 138, a bound acrylonitrile content of 6.4 weight percent (by Carlo Erba nitrogen analysis), a bound styrene content of 36.4 weight percent (by FTIR analysis), and a glass transition temperature of −28.5° C. (by DSC, Differential Scanning Calorimetry).

EXAMPLE 2

Styrene-Butadiene-Acrylonitrile Polymer (SBR-3AN)

The procedure of Example 1 was repeated except a total of 273 grams of acrylonitrile was used instead of the total of 546 grams as per Example 1. In this example, the incremental addition was repeated except only one half of each amount of acrylonitrile was used. A portion of the latex was isolated for subsequent blending and the remaining latex coagulated as per Example 1. The dry rubber had a Mooney viscosity (100° C.) of 127, a bound acrylonitrile content of 3.8 weight percent (by Carlo Erba nitrogen analysis), a bound styrene content of 40.4 weight percent (by FTIR analysis) and a glass transition temperature of −28° C. (by DSC, Differential Scanning Calorimetry).

EXAMPLE 3

Preparation of Emulsion Polybutadiene (EPBD)

To a ten-gallon reactor which had been evacuated under vacuum, 17.52 kg of water, 16.05 grams of the sodium salt of condensed naphthalene sulfonic acid (85% active), 40 grams of tripotassium phosphate, 400 grams of a mixture of the potassium soap of rosin acid and the sodium salt of hydrogenated mixed fatty acids, and 18.2 grams of tert-dodecyl mercaptan were added, and the pH of the solution was adjusted to 10-11 with 10 weight percent sodium hydroxide. Next, a solution of 475 grams of water, 2.9 grams of tetrasodium salt of ethylenediaminetetraacetate, 0.73 grams of ferrous sulfate heptahydrate and 4.0 grams of sodium formaldehyde sulfoxylate were added. Then 9.08 kg of 1,3-butadiene was added. The reaction mixture was cooled to 10° C. and 8.27 grams of para-menthane hydroperoxide (55% active) in 91 grams of water was added. The emulsion polymerization was allowed to proceed, and the percent solids of the latex solution was taken at intervals to follow the polymer conversion. At 59% conversion, the polymerization mixture was shortstopped with a solution of 114 grams of sodium dimethyldithiocarbamate (40% active), 5.35 grams of N,N-diethylhydroxylamine (85% active), and 386 grams of water. The resulting latex was steam stripped for 2 hours at 50° C. The final solids were 18.7%.

EXAMPLE 4

75/25 Weight Percent Blend of Styrene-Butadiene-Acrylonitrile Polymer (SBR-6AN)/ Emulsion Polybutadiene To a blend of 2175 grams of styrene-butadiene. acrylonitrile latex of Example 1 prepared in accordance with Example 1 and 740 grams of emulsion polybutadiene latex prepared in accordance with Example 3, 6.0 grams of tris(nonylphenyl)phosphite (Polygard ™, Uniroyal Chemical Company) and 420 grams of highly aromatic extending oil emulsion (containing 50 weight percent oil) were added with stirring. The 50 weight percent oil emulsion was prepared as follows. A mixture of 840 grams of a highly aromatic extending oil, 34 grams of oleic acid, and 34 grams of Wingstay ® 100 (The Goodyear Tire & Rubber Company) were mixed and heated to 60° C. to dissolve the Wingstay ® 100. While stirring, a solution of 6.4 grams of potassium hydroxide in 768 grams of water at 60° C. was added slowly. After the addition of the potassium hydroxide solution was completed, the emulsion was mixed at high speed for 10 minutes. A coagulation solution was prepared by mixing water, sodium chloride, and Perchem ® 503 (a polyamine). The pH was adjusted to 3 to 4. The latex was slowly added to the coagulation solution with mixing. The resulting rubber crumb was removed from the solution and washed three times with water. The wet rubber crumb was dried in a forced air oven at 65° C. The Mooney viscosity of the dried oil-extended rubber was 64.

EXAMPLE 5

50 Weight Percent/50 Weight Percent Blend of Styrene-Butadiene-Acrylonitrile Polymer (SBR-6AN)/ Emulsion Polybutadiene The procedure of Example 4 was repeated except a 50 weight percent/50 weight percent blend was prepared. The Mooney viscosity of the dried oilextended rubber was 52.

EXAMPLE 6

75 Weight Percent/25 Weight Percent Blend of Styrene-Butadiene-Acrylonitrile Polymer (SBR-3AN)/ Emulsion Polybutadiene The procedure of Example 3 was repeated except the SBR.3AN latex of Example 2 was used in place of the SBR.6AN latex of Example 1. The Mooney viscosity of the dried oil extended rubber was 58.5.

EXAMPLE 7

Preparation of Styrene-Butadiene Copolymer

The same general 10-gallon batch procedure and amounts of materials used in Example 1 were utilized with the following exceptions. No acrylonitrile was used and 2.63 kg of styrene and 6.36 kg of 1,3-butadiene were added in place of the amounts specified in Example 1. The final latex solids content was 19.0%. The latex was oil extended and coagulated as per the latex in Example 3. The Mooney viscosity of the oil extended rubber was 64. The raw rubber had a glass transition temperature of 53° C. and a 21.6% bound styrene content (FTIR Analysis).

EXAMPLE 8

Preparation of Styrene-Butadiene Copolymer

The same general 10-gallon batch procedure and amounts of materials used in Example 1 were utilized with the following exceptions. No acrylonitrile was used and 4.63 kg of styrene, 4.36 kg of 1,3-butadiene, and 7.28 grams of tert-dodecyl mercaptan were added in place of the amounts specified in Example 1. The final latex solids content after stripping was 18.0%. The latex was oil extended and coagulated as per the latex in Example 3. The Mooney viscosity of the oil extended rubber was 56, and the raw rubber had a bound styrene content of 40.0%.

EXAMPLE 9

The rubbers from Examples 4-8 were compounded in a Brabender using the compounding ingredients shown in Table I. The Amax, methyl tuads, and sulfur were added to the black stocks on a mill. The compounded stocks were cured in a 2"×2"×0.020" cure cavity mold at 150° C. for 25 minutes to obtain samples for testing on the Autovibron Dynamic Viscoelastometer (Inmass, Inc.) at 0° C., 11 Hz. The Goodyear-Healy Rebound test was carried out according to the ASTM D1054-87 procedure. The Din abrasion was determined using a Zwick abrasion tester according to the ISO (International Standards Organization) procedure of ISO 4649-1985 (E), Annex B, Standard Rubbers.

TABLE I

| Compounding Ingredients | |
| --- | --- |
| Polymer[a] | 137.50 |
| Zinc Oxide | 3.00 |
| Stearic Acid | 2.00 |
| Wingstay ® 29 | 1.00 |
| Wingstay ® 100 | 1.25 |
| Sunolite 240 Wax | 2.00 |
| N-299 Black | 75.00 |
| Highly Aromatic Oil | 12.50 |
| Amax[b] | 1.30 |
| Methyl Tuads[c] | 0.30 |
| Sulfur | 1.60 |
| | 237.45 |

[a]Contains 37.5 weight parts per hundred weight parts polymer of highly aromatic oil
[b]N-oxydiethylene benzothiazole-2-sulfenamide. R. T. Vanderbilt
[c]Tetramethylthiuram disulfide. R. T. Vanderbilt Table II below presents the physical data for Examples 4–8.

TABLE II

| Example No. | 4 | 5 | 6 | Control 7 | Control 8 |
| --- | --- | --- | --- | --- | --- |
| SBR-6AN (Example 1) | 75 | 50 | | | |
| SBR-3AN (Example 2) | | | 75 | | |
| EPBD (Example 3) | 25 | 50 | 25 | | |
| SBR (Example 7) 21.6% Styrene | | | | 100 | |
| SBR (Example 8) 40.0% Styrene | | | | | 100 |
| DIN Abrasion Avg. Mass Loss (mgm) | 108.1 | 86.0 | 94.1 | 94 | 172 |
| Goodyear-Healy Rebound Cold Rebound, % | 32.2 | 34.5 | 33.0 | 44.5 | 32.2 |
| Autovibron 0° C. Tan Delta | 0.450 | 0.448 | 0.521 | 0.193 | 0.482 |

As can be seen above, an improvement in wet traction over Control 7 (23% styrene SBR) is noted in the low Goodyear-Healy rebound values and the high tan delta values at 0° C. of the rubbers of Examples 4–6 which are comparable to the corresponding values for Controα 8 (40% styrene SBR). The good abrasion resistance of Control 7 (23% styrene SBR) as noted by the low Din abrasion value is exhibited by the rubbers of Examples 4–6 as compared to the high Din abrasion value which represents poor abrasion resistance for Control 8 (40% styrene SBR).

Thereby, the rubbers of Examples 4–6 show the good abrasion resistance of Control 7 and the good wet traction of Control 8 at the same time. Normally, with SBR rubbers in tread stocks, as the level of styrene in the SBR rubber is increased, an improvement in wet traction can be achieved only at the expense of a large corresponding decrease in abrasion resistance. This trade-off in properties is noted by comparison of the data in Table II for control 7 (23% styrene SBR) and Control 8 (40% styrene SBR). The good wet traction of Control 8 is reflected by the high tan delta value at 0° C. and the low Goodyear Healy rebound value but correspondingly, the poor abrasion resistance is reflected by the high Din abrasion value.

What is claimed is:

1. A rubber stock comprising
   (1) from about 1 to about 99 parts by weight of a polymer resulting from the copolymerization of at least three monomers wherein:
   (a) from about 40 to about 84 weight percent of the polymer being derived from a conjugated diolefin selected from the group consisting of 1,3-butadiene, 2,3-dimethyl-1,3-butadiene, 2-methyl-1,3-butadiene, 2-ethyl-1,3-butadiene, 1,3-pentadiene, 2-methyl-1,3-pentadiene, 1,3-hexadiene, 2-phenyl-1,3-butadiene, 3,4-dimethyl-1,3-hexadiene, 1,3-heptadiene, 1,3-octadiene, 4,5-diethyl-1,3-octadiene, 3-methyl-1,3-pentadiene, 4-methyl-1,3-pentadiene or mixtures thereof;
   (b) from about 15 to about 50 weight percent of the polymer being derived from a vinyl-substituted aromatic compound containing from 8 to 16 carbon atoms; and
   (c) from about 1 to 8 weight percent of the polymer being derived from an olefinically unsaturated nitrile selected from the group consisting of acrylonitrile, methacrylonitrile, ethacrylonitrile, crotononitrile or mixtures thereof; and
   (2) from about 99 to about 1 parts by weight of natural rubber or a rubber derived from a diene monomer selected from the group consisting of polybutadiene, styrenebutadiene rubber, synthetic polyisoprene rubber, isoprene-butadiene rubber, isoprenebutadiene-styrene rubber, nitrile rubber, carboxylated nitrile rubber and EPDM.

2. The polymeric composition of claim 1 wherein said diene rubber is in the form of a latex.

3. The polymeric composition of claim 1 wherein from about 25 to 85 parts by weight of said polymeric composition is combined with from about 75 to 15 parts by weight of said natural rubber or rubber derived from a diene monomer.

4. The polymeric composition of claim 1 wherein said rubber derived from a diene monomer is polybutadiene rubber.

5. The rubber stock of claim 1 wherein said vinyl-substituted aromatic compound is selected from the group consisting of styrene, alpha-methylstyrene, vinyltoluene, 3-methylstyrene, 4-methylstyrene, 4-cyclohexylstyrene, 4-para-tolylstyrene, parachlorostyrene, 4-tert-butylstyrene, 1-vinylnaphthalene, 2-vinylnaphthalene or mixtures thereof.

6. The rubber stock of claim 1 wherein said polymer has a Tg ranging from about −60° C. to about 0° C.

7. The rubber stock of claim 1 wherein
   (a) from about 50 to 70 weight percent of the polymer is derived from a conjugated diolefin;
   (b) from about 30 to 45 weight percent of the polymer is derived from a vinylsubstituted aromatic compound; and
   (c) from about 2 to 6 weight percent of the polymer is derived from an olefinically unsaturated nitrile.

8. The rubber stock of claim 1 wherein said conjugated diolefin is 1,3-butadiene.

9. The rubber stock of claim 5 wherein said vinyl-substituted aromatic compound is styrene.

10. The rubber stock of claim 1 wherein said olefinically unsaturated nitrile is acrylonitrile.

11. The rubber stock of claim 1 wherein said polymer is in the form of a latex.

12. The rubber stock of claim 6 wherein the Tg ranges from about −45° to about −15° C.

* * * * *